(12) United States Patent
Tisserand et al.

(10) Patent No.: US 6,719,579 B2
(45) Date of Patent: Apr. 13, 2004

(54) CHIP CARD CONNECTOR WITH LOCKING MECHANISM

(75) Inventors: Frederic Tisserand, Bonnay (FR); Michel Pernet, Doubs (FR)

(73) Assignee: Framatome Connectors International, Courbevoie (FR)

( * ) Notice: Subject to any disclaimer, the term of this patent is extended or adjusted under 35 U.S.C. 154(b) by 0 days.

(21) Appl. No.: 09/991,292

(22) Filed: Nov. 14, 2001

(65) Prior Publication Data

US 2002/0090853 A1 Jul. 11, 2002

(30) Foreign Application Priority Data

Nov. 14, 2000 (FR) .............................. 00 14990

(51) Int. Cl.⁷ .............................................. H01R 13/62
(52) U.S. Cl. ...................................................... 439/331
(58) Field of Search ................. 439/331, 326, 439/73, 630

(56) References Cited

U.S. PATENT DOCUMENTS

| | | | | |
|---|---|---|---|---|
| 4,715,835 A | * | 12/1987 | Matsuoka | 439/331 |
| 5,224,873 A | | 7/1993 | Duffet et al. | 439/326 |
| 5,603,629 A | | 2/1997 | DeFrasne et al. | 439/331 |
| 5,813,878 A | * | 9/1998 | Kuwata et al. | 439/331 |
| 5,986,891 A | | 11/1999 | Sugimoto | 361/737 |
| 6,099,337 A | | 8/2000 | Chan | 439/326 |
| 6,174,188 B1 | * | 1/2001 | Martucci | 439/331 |
| 6,273,739 B1 | * | 8/2001 | Konno et al. | 439/331 |
| 6,334,786 B1 | * | 1/2002 | Lee | 439/331 |

FOREIGN PATENT DOCUMENTS

FR  2696031  3/1994

* cited by examiner

*Primary Examiner*—Renee Luebke
*Assistant Examiner*—Felix O. Figueroa
(74) *Attorney, Agent, or Firm*—Perman & Green, LLP

(57) ABSTRACT

A chip card connector having a base frame (2) with integrated contact springs (3) and a closing cover (4) hinged from above, where the closing cover (4), presses the chip card inserted into the base frame (2), against the contact springs (3), projecting into the interior of the base frame and has on the side and opposite its axis of rotation, two stop arms with their indexing tips (9, 10) engaged in closed position under the shoulders (11, 12) provided on the edge of the base frame (2) opposite and able to be folded one against the other at the cover (4) in order to bring about its closure.

9 Claims, 2 Drawing Sheets

CHIP CARD CONNECTOR WITH LOCKING MECHANISM

BACKGROUND OF THE INVENTION

1. Field of the Invention

The present invention relates to a chip card connector comprising a base frame with integrated contact springs and a closing cover, the cover being hinged on the base frame.

2. Description of Prior Developments

A type of chip card connector as defined above is described in U.S. Pat. No. 5,603,629. The chip card connector as described has in its closing cover a support for the chip card by which the latter is positioned in a precise manner. The base frame with integrated contact springs has a grid for fixing the contact spring precisely, in such way that the chip card connector as a whole, with its minimum of four surface layers, occupies a relatively large amount of space which is a major disadvantage when operating under very tight space conditions.

SUMMARY OF THE INVENTION

The present invention has as a primary objective that of improving a chip card connector in such a way that with minimum dimensions and a minimum construction height, the opening and closing of a the chip card connector cover is possible even under extremely tight space conditions.

The above described objective is achieved according to the features of the present invention, by a chip card connector comprising a base frame with integrated contact springs and a closing cover hinged from above the base frame in such a way that in a closed position, the chip card introduced into the base frame leans against the contact springs, projecting into the interior of the base frame in which the closing cover has on the side opposite its rotation axis, two stop arms with their indexing tip members engaged in the closed position under the shoulders provided on the edge of the base frame located opposite one another, and which can rapidly be folded against one another at the cover, in order to cause it to open.

According to a preferred embodiment of the present invention, the stop arms are essentially made from two small bars coming from three open recesses, arranged next to one another, which extend as far as a front zone in which they are widened and the indexing tip members being located on the front edge bent at 90° angle.

According to a further embodiment of the present invention, projections are provided in the widened front zone of the stop arms in order to catch the arms.

The chip card connector according to the invention has an extremely reduced construction volume, given that essentially, it consists of two parts, each of which performs all the functions which in the hitherto state of the art, were divided over different individual components. In this way, the chip card is guided at the same time as it is being placed into the base frame, in such a way that it reaches its final position. The contact springs are integrated directly into the base and project through the openings, which are provided there, into the interior of the chip card connector where they meet the corresponding contacts on the chip card. The closing cover develops the necessary pressure, whereby the chip card is pressed against the contact springs and forms a closing mechanism, which is very easy to use by the top, such that it is possible to dispense with a side access of the chip card connector when it is being fitted under restricted conditions of space. This is particularly interesting for the fitting of chip card connectors for SIM cards in mobile telephones, which, due to their compact constructions, leave only an extremely small space for the fitting of a chip card connector.

BRIEF DESCRIPTION OF THE DRAWINGS

The foregoing aspects and other features of the present invention are explained in the hereinafter description, taken in connection with the accompanying drawings, wherein.

DESCRIPTION OF THE PREFERRED EMBODIMENTS

Figure 1:
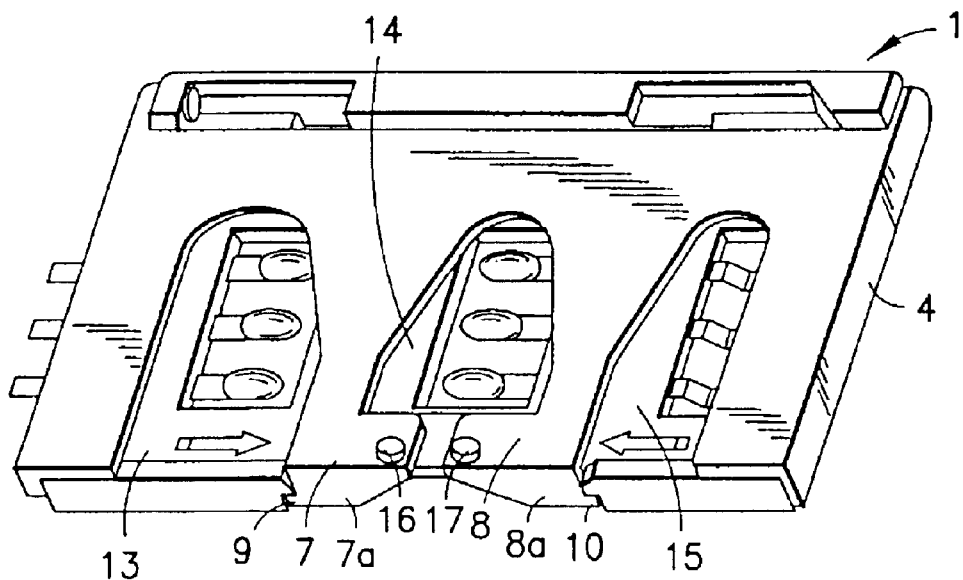
FIG. 1 is a chip card connector empty and in closed position according to the invention.

FIG. 1 shows the chip card connector 1 according to the invention, empty and in a closed position. The closing cover 4 has three large recesses 13, 14, 15 open on one side of the cover, such that small bars are formed which serve as stop arms 7, 8. These stop arms 7, 8 become thinner at their free end in order to make them flexible in the direction of the cover. The front zones 7a, 8a of the stop arms are widened and extend above the front edge of the chip card connector downwards into the right hand corner with respect to the surface of the closing cover. On the front edges there are arranged indexing tip members 9, 10, which, as shown in FIG. 2, engage the under the shoulders 11, 12 which are formed in the front edge of the base frame 2.

Figure 2:
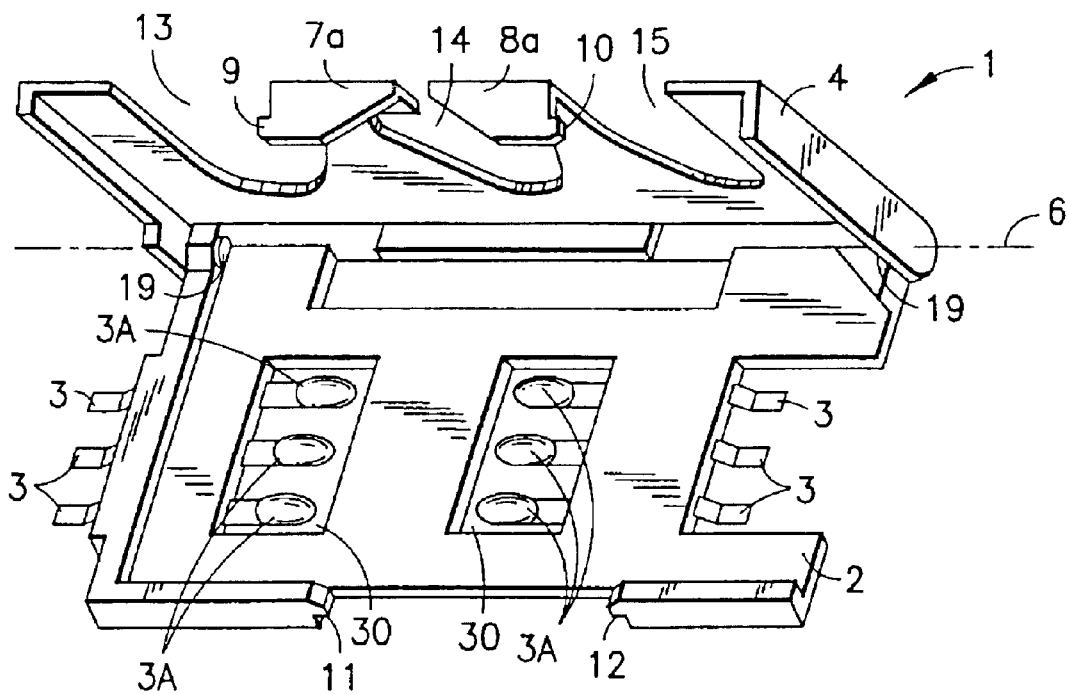
FIG. 2 is the chip card connector from FIG. 1 in open position.

FIG. 2 illustrates the chip card connector 1 in an open position showing contact springs 3 that are fixed within the base, the free ends 3A of which project through recesses 30 in the interior portion of the card connector 1. The interior portion of the base frame 2 has a contour, which corresponds to the SIM chip card to be inserted within the connector, such that the card lies precisely opposite to the corresponding contact springs 3.

Figure 3:
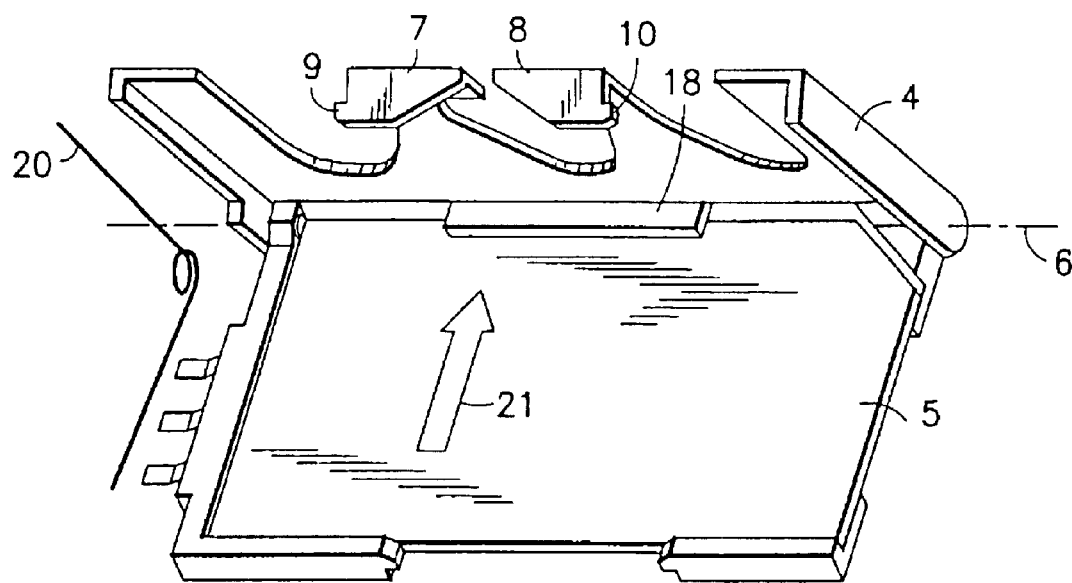
FIG. 3 is the chip card connector from FIG. 2 with the SIM card inserted.

As shown in FIG. 3 the correct positioning of the chip card 5 is moreover ensured by a retaining member 18, which is arranged in the zone of the axis of rotation 6 of cover 4 in the center of the edge of the base frame under which the chip card 5 is pushed when it is introduced (see arrow 21 in FIG. 3) The closing cover 4 is hinged to the base frame 2 by hinge pins 19; the said hinge pins being arranged on extensions of the lateral edges of the closing cover 2 which are of such dimensions that the closing cover 4 does not cover the retaining member 18, but can be lowered in front of its front longitudinal edge, until the surface of the retaining member 18 and the surface of the closing cover 4 are on the same level. In this way, by closing the closing cover 4, the chip card 5 leans evenly against the elastic force of the contact springs 3 until the level of the lower edge of the small bar 18, which causes the closing cover 4 to be indexed in that position under the shoulders 11, 12 which receive the indexing tip members 9, 10.

As further shown in FIG. 3, the unlocking of the indexing takes place by a movement of superposition of the stop arms 7, 8. For this purpose, they are caught by the claws of the chip and of the index at the shoulders 16, 17 (see FIG. 1) which releases the indexing tip members 9, 10 from the shoulders 11, 12. A spring 20 shown in FIG. 3, which is fitted between the base frame 2 and the closing cover 4 in the usual way, automatically causes the closing cover 4 to spring open so that a SIM card can be inserted or extracted.

Figure 4:
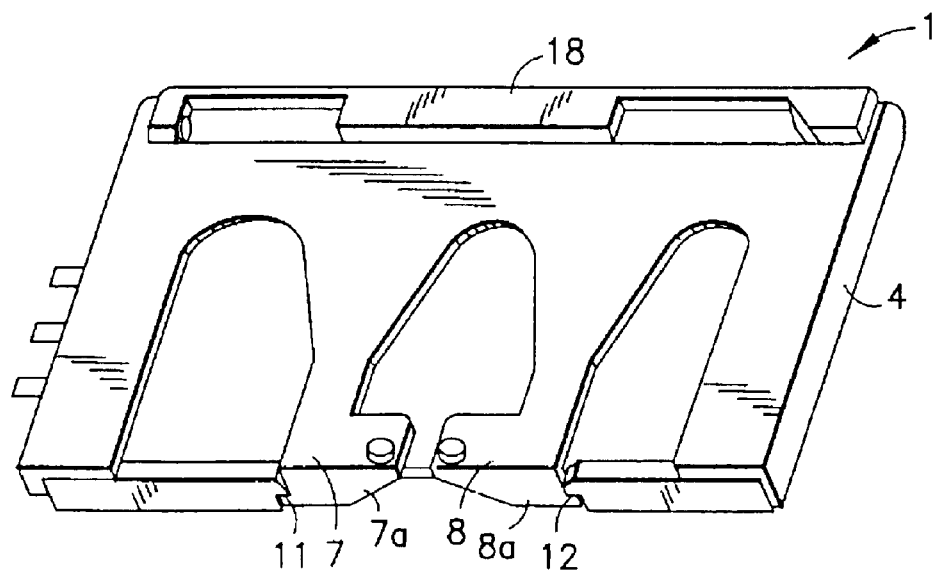
FIG. 4 is the chip card connector from FIG. 3 in closed position.

The chip card connector 1 according to the features of the present invention, is formed of an extremely flat construction (see FIG. 4), given that its construction height is only finally determined by the thickness of the materials of the base and of the closing cover 4, such that the final arrangement corresponds to the construction height of its parts plus the thickness of the SIM card. Due to the fact that the mechanism of opening of the stop arms 7, 8 is accessible from above, it is possible to dispense with the side access of the chip card connector which favours its fitting in a restricted space, especially in mobile telephones.

It should be understood that the above description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A chip card connector comprising a base frame having integrated contact springs and a closing cover hinged from above the base frame whereby in a closed position, a chip card inserted into the base frame lies in contiguous contact against portion of the contact springs projecting into an interior of the base frame, wherein the closing cover includes on a side opposite a hinged side of the closing cover, two stop arms having indexating tip members engaged in a closed position under shoulders provided on an edge of the base frame, the stop arms being located inwards and spaced apart from lateral sides of the closing cover opposite each other and adapted to be folded one against one another at the cover in order to cause the cover to open.

2. A chip card connector according to claim 1, wherein said stop arms are formed from two small bars extending along three recesses open on one side of said cover, the recesses being arranged next to each other, the bars extending up to a front zone in which the bars are widened, said indexing tip members being located on a front edge of said cover and being bent at a 90° angle.

3. A chip card connector according to claim 2, wherein each of said indexing tip members is beveled to facilitate passage into said covers closed position.

4. A chip card connector according to claim 1, wherein on an edge of said base frame that is located close to an axis of rotation of said cover, a retaining member is formed, said retaining member being adapted to admit the chip card therein.

5. A chip card connector according to claim 4, wherein said cover while closing has located on the lateral edges hinge pins and when said cover is closed, said cover is on a plane parallel to said retaining member.

6. A chip card connector according to claim 1, wherein a projection is provided on a front zone of each of said stop arms for engaging said arms.

7. A chip card connector according to claim 1, further including a spring member adapted to allow for said cover when closed and locked to spring open automatically when unlocked.

8. A chip card connector comprising a base frame having integrated contact springs and a closing cover hinged from above the base frame whereby in a closed position, a chip card inserted into the base frame lies in contiguous contact against a portion of the contact springs projecting into an interior of the base frame, wherein the closing cover includes on a side opposite a hinged side of the closing cover, two stop arms having indexating tip members engaged in a closed position under shoulders provided on an edge of the base frame, the stop arms being located inwards and spaced apart from lateral sides of the closing cover opposite each other and adapted to be folded one against one another at the cover in order to cause the cover to open, the stop arms being formed from two small bars defining three slots formed in the cover that all open on one side of the cover, the slots being arranged next to one another, the bars extending up to a front zone in which the stop arms are widened, the indexing tip members being located on a front edge of the cover and being bent at a 90° angle.

9. A chip card connector comprising a base frame having integrated contact springs and a closing cover hinged from above the base frame whereby in a closed position, a chip card inserted into the base frame lies in contiguous contact against a portion of the contact springs projecting into an interior of the base frame, wherein the closing cover includes on a side opposite a hinged side of the closing cover, two stop arms having indexation tip members engaged in a closed position under shoulders provided on an edge of the base frame, the stop arms being located inwards and spaced apart from lateral sides of the closing cover opposite each other and adapted to be folded one against one another at the cover in order to cause the cover to open, the stop arms being formed from two small bars defining three slots formed in the cover that all open on one side of the cover, the slots being arranged next to each other, the bars extending up to a front zone in which they are widened, the indexing tip members being located on a front edge of the cover and being bent at a 90° angle, and further wherein projections are provided a front zone of the stop arms for engaging the arms.

* * * * *